US009996493B2

(12) United States Patent
Yamagishi et al.

(10) Patent No.: US 9,996,493 B2
(45) Date of Patent: Jun. 12, 2018

(54) SEMICONDUCTOR DEVICE AND MEMORY SYSTEM

(71) Applicant: Toshiba Memory Corporation, Minato-ku (JP)

(72) Inventors: Kunihiko Yamagishi, Yokohama (JP); Toshitada Saito, Yokohama (JP)

(73) Assignee: TOSHIBA MEMORY CORPORATION, Minato-ku (JP)

(*) Notice: Subject to any disclaimer, the term of this patent is extended or adjusted under 35 U.S.C. 154(b) by 0 days. days.

(21) Appl. No.: 15/627,821

(22) Filed: Jun. 20, 2017

(65) Prior Publication Data
US 2017/0300448 A1 Oct. 19, 2017

Related U.S. Application Data

(63) Continuation of application No. 15/257,666, filed on Sep. 6, 2016, now Pat. No. 9,720,870, which is a (Continued)

(30) Foreign Application Priority Data

Dec. 9, 2009 (JP) ................................. 2009-279719

(51) Int. Cl.
H04L 25/40 (2006.01)
G06F 13/40 (2006.01)
(Continued)

(52) U.S. Cl.
CPC ...... G06F 13/4068 (2013.01); G06F 12/0246 (2013.01); G06F 13/385 (2013.01);
(Continued)

(58) Field of Classification Search
CPC ............. G06F 13/4068; G06F 13/4282; G06F 13/4063; G06F 13/385; G06F 13/40;
(Continued)

(56) References Cited

U.S. PATENT DOCUMENTS 7,782,805 B1 8/2010 Belhadj et al.
8,781,024 B2 * 7/2014 Yamagishi .............. G06F 13/42
370/473

(Continued)

FOREIGN PATENT DOCUMENTS

CN 101097543 A 1/2008
EP 0556 983 A1 2/1993
(Continued)

OTHER PUBLICATIONS

Office Action dated Jul. 3, 2017 in Chinese Patent Application No. 201510323859.0.
(Continued)

Primary Examiner — Siu Lee
(74) Attorney, Agent, or Firm — Oblon, McClelland, Maier & Neustadt, L.L.P.

(57) ABSTRACT

A semiconductor device capable of communicating with a host apparatus includes a symbol generation unit, a coding unit, and a transmission unit. The symbol generation unit includes a random number generation circuit and generates a symbol according to a random number generated by the random number generation circuit. The coding unit performs 8b/10b coding for the symbol. The transmission unit transmits the symbol coded by the 8b/10b coding unit to the host apparatus.

8 Claims, 10 Drawing Sheets

Related U.S. Application Data continuation of application No. 14/797,970, filed on Jul. 13, 2015, now Pat. No. 9,471,527, which is a continuation of application No. 14/292,180, filed on May 30, 2014, now Pat. No. 9,111,048, which is a continuation of application No. 13/514,736, filed as application No. PCT/JP2010/066464 on Sep. 15, 2010, now Pat. No. 8,781,024.

(51) Int. Cl.
 G06F 13/42 (2006.01)
 H04L 25/03 (2006.01)
 G06F 13/38 (2006.01)
 G06F 12/02 (2006.01)

(52) U.S. Cl.
 CPC .......... *G06F 13/40* (2013.01); *G06F 13/4063* (2013.01); *G06F 13/42* (2013.01); *G06F 13/4282* (2013.01); *H04L 25/03828* (2013.01); *G06F 2212/7201* (2013.01); *G06F 2213/3804* (2013.01); *G06F 2213/3854* (2013.01)

(58) Field of Classification Search
 CPC ................ G06F 13/42; G06F 12/0246; G06F 2212/7201; G06F 2213/3854; G06F 2213/3804; H04L 25/03866; H04L 25/38; H04L 25/4049; H04L 25/4906; H04L 25/4908
 USPC ................ 375/295, 296, 288; 370/512, 473; 710/305
 See application file for complete search history.

(56) References Cited

U.S. PATENT DOCUMENTS

| | | | |
|---|---|---|---|
| 9,111,048 B2 * | 8/2015 | Yamagishi | G06F 13/42 |
| 9,471,527 B2 * | 10/2016 | Yamagishi | G06F 13/42 |
| 9,720,870 B2 * | 8/2017 | Yamagishi | G06F 13/42 |
| 2002/0018492 A1 | 2/2002 | Sakai et al. | |
| 2003/0103253 A1 | 6/2003 | Bunton | |
| 2004/0098545 A1 | 5/2004 | Pline et al. | |
| 2006/0139186 A1 | 6/2006 | Hoyer | |
| 2006/0267810 A1 | 11/2006 | Widmer | |
| 2007/0290902 A1 | 12/2007 | Bae et al. | |
| 2008/0046639 A1 | 2/2008 | Tsuji | |
| 2009/0319706 A1 | 12/2009 | Okazaki et al. | |
| 2009/0323722 A1 | 12/2009 | Sharma | |
| 2010/0005109 A1 | 1/2010 | Etoh | |
| 2010/0285756 A1 | 11/2010 | Nakazawa | |

FOREIGN PATENT DOCUMENTS

| | | |
|---|---|---|
| JP | 2002 84247 | 3/2002 |
| JP | 2003 204363 | 7/2003 |
| JP | 2004 171561 | 6/2004 |
| KR | 10-2007-0061236 | 6/2007 |
| KR | 10-0849956 | 7/2008 |

OTHER PUBLICATIONS

Combined Office Action and Search Report dated Jun. 30, 2014 in Chinese Patent Application No. 201080056003.7 (w/English translation).

Written Opinion dated Dec. 21, 2010 in PCT/JP2010/066464 filed Sep. 15, 2010.

Stauffer, D.R., et al., "High Speed Serdes Devices and Applications," Springer, pp. 140-143, (Oct. 23, 2008).

International Search Report dated Dec. 21, 2010 in PCT/JP10/66464 Filed Sep. 15, 2010.

International Preliminary report on Patentability dated Jun. 21, 2012 in PCT/JP2010/066464 filed Sep. 15, 2010.

Office Action dated Aug. 9, 2013 in Korean Patent Application No. 10-2012-7014714 (w/English translation).

European Search Report dated May 10, 2017 in European Application No. 10 835 759.1.

* cited by examiner

| Pin No. | Signal |
|---|---|
| Pin 1 | Card detection/data 3 (DAT3) |
| Pin 2 | Command (CMD) |
| Pin 3 | GND |
| Pin 4 | Supply voltage (VDD) |
| Pin 5 | Clock (CLK) |
| Pin 6 | GND |
| Pin 7 | Data 0 (DAT0) |
| Pin 8 | Data 1 (DAT1) |
| Pin 9 | Data 2 (DAT2) |
| Pin 10 | Supply voltage (VDD)/GND |
| Pin 11 | Data (D1+) |
| Pin 12 | Data (D1−) |
| Pin 13 | Supply voltage (VDD)/GND |
| Pin 14 | Supply voltage (VDD)/GND |
| Pin 15 | Data (D0−) |
| Pin 16 | Data (D0+) |
| Pin 17 | Supply voltage (VDD)/GND |

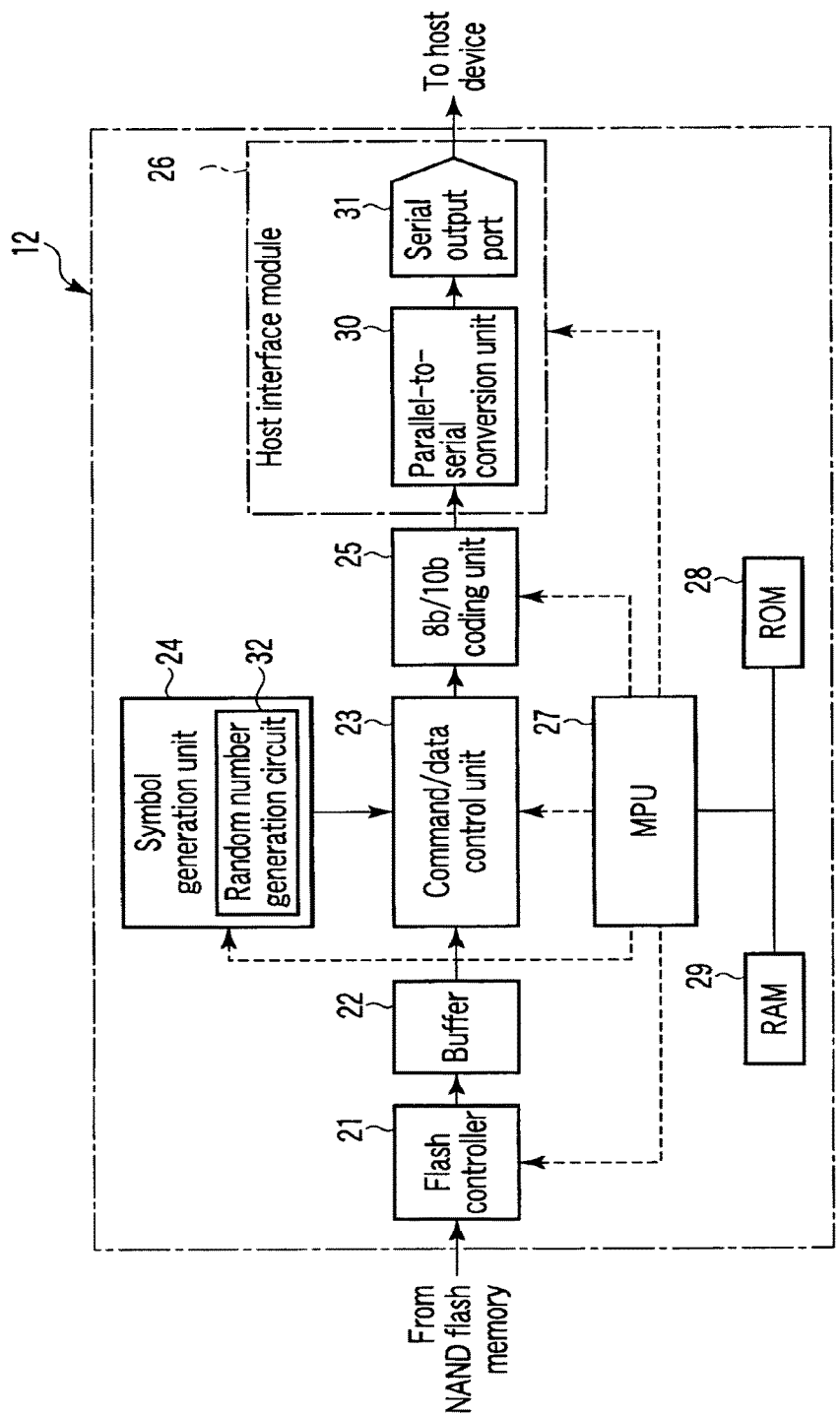
F I G. 3

| Symbol name | Function | Code in 8b/10b |
|---|---|---|
| SYN | Synchronization | D31.5 |
| COM | Comma (or delimiter) | K28.5 |
| LIDL0 | Idle state | K28.3 |
| LIDL1 | Idle state | D13.2, D19.2 or D18.5 |
F I G. 4
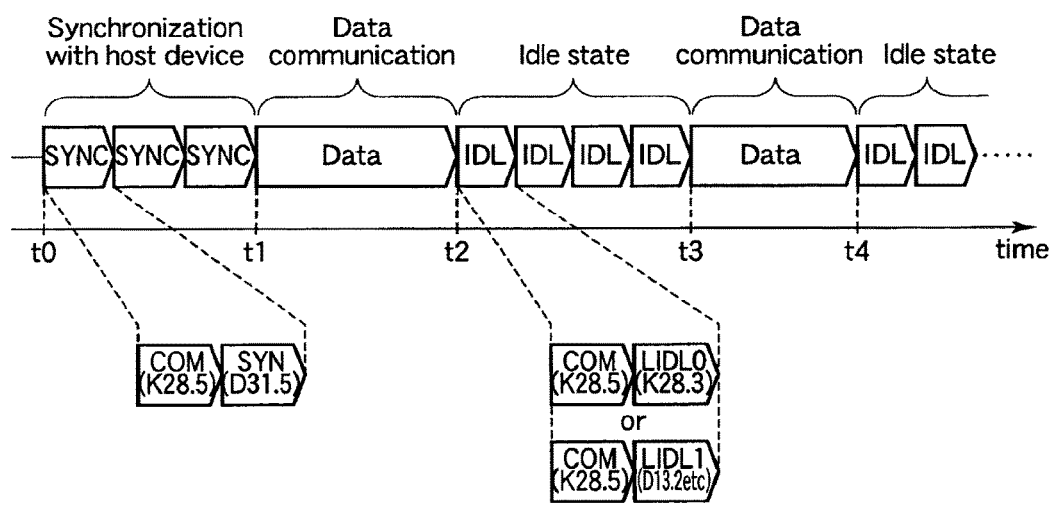
F I G. 5

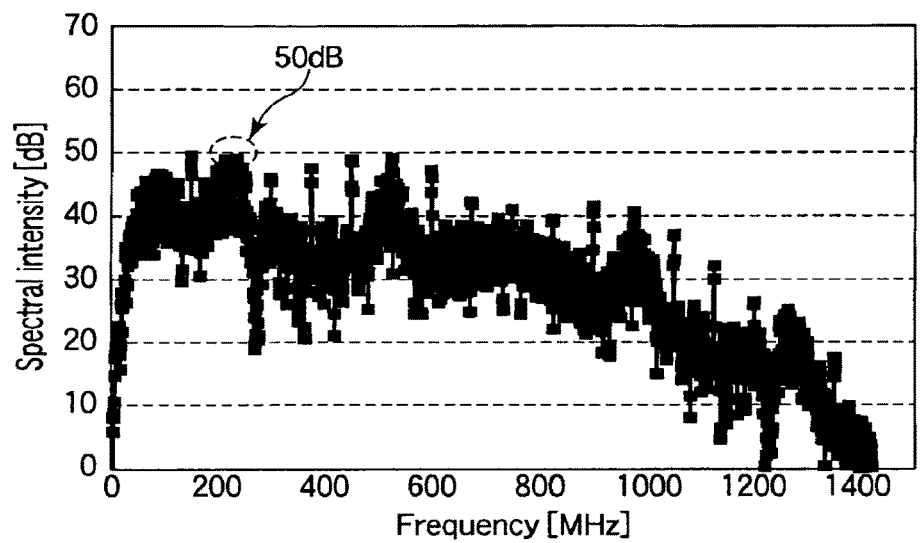
F I G. 9
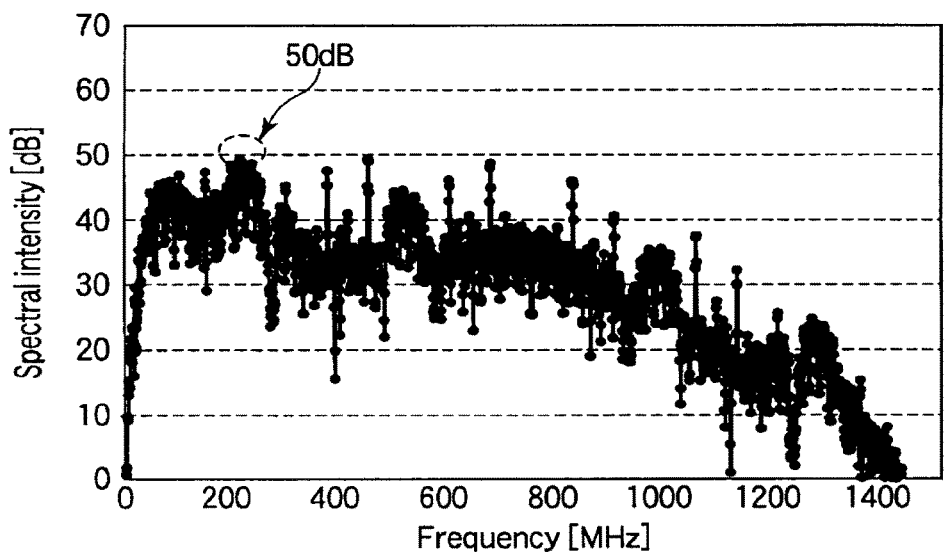
F I G. 10

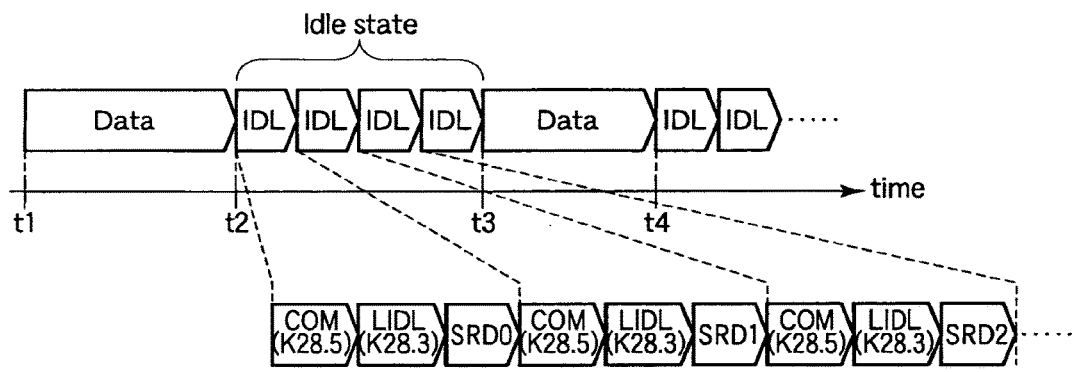
F I G. 12
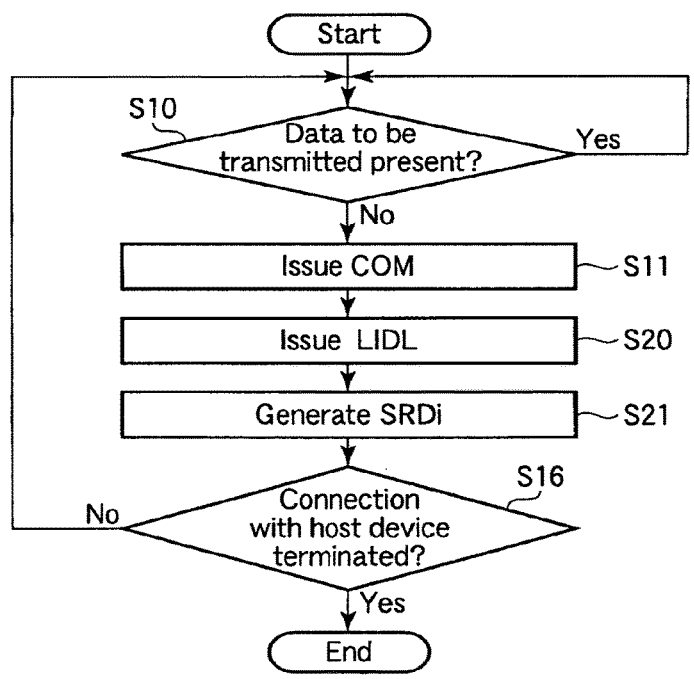
F I G. 13

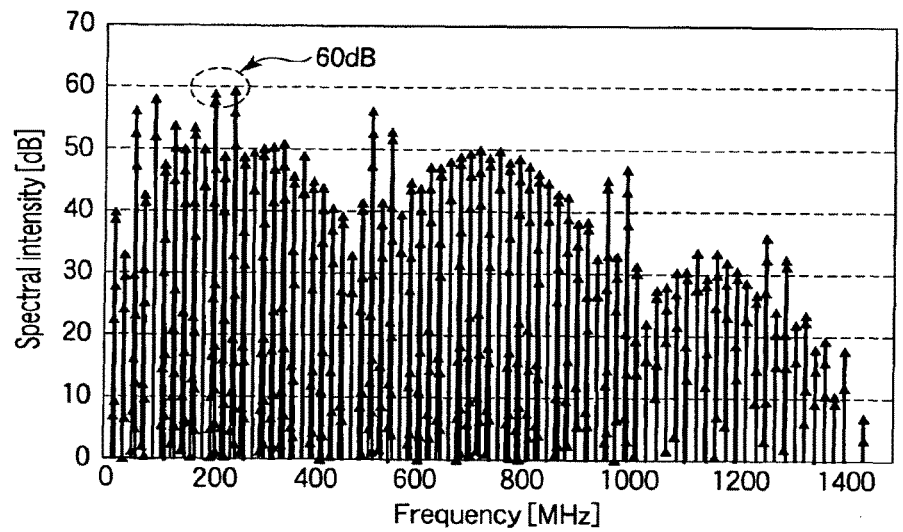
F I G. 14
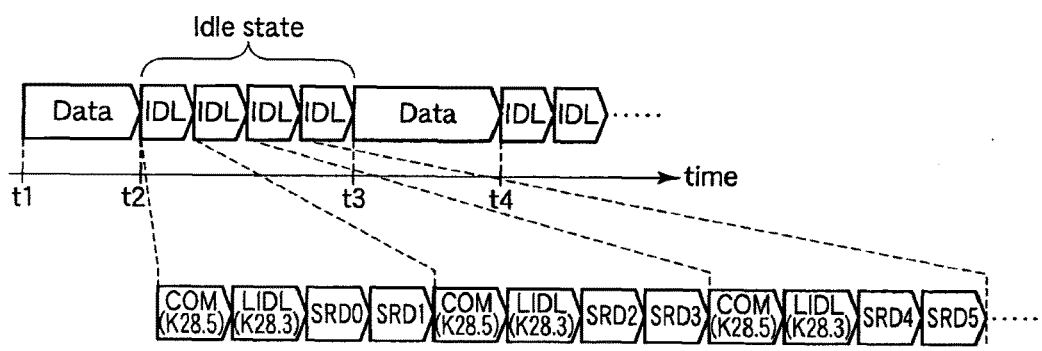
F I G. 15

SEMICONDUCTOR DEVICE AND MEMORY SYSTEM

CROSS-REFERENCE TO RELATED APPLICATIONS

This application is a continuation of and claims the benefit of priority under 35 U.S.C. § 120 from U.S. Ser. No. 15/257,666 filed Sep. 6, 2016, which is continuation of U.S. Ser. No. 14/797,970 filed Jul. 13, 2015 (now U.S. Pat. No. 9,471,527 issued Oct. 18, 2016), which is a continuation of U.S. Ser. No. 14/292,180 filed May 30, 2014 (now U.S. Pat. No. 9,111,048 issued Aug. 18, 2015), which is a continuation of U.S. Ser. No. 13/514,736 filed Jun. 8, 2012 (now U.S. Pat. No. 8,781,024 issued Jul. 15, 2014), which is a U.S. national phase application under 35 U.S.C. § 371 of International Application PCT/JP2010/066464 filed on Sep. 15, 2010. This application also claims the benefit of priority under 35 U.S.C. § 119 from Japanese Patent Application No. 2009-279719 filed Dec. 9, 2009. The entire contents of each of which are incorporated herein by reference.

FIELD

Embodiments described herein relate generally to a semiconductor device and memory system and, for example, a method for communication between a memory system and a host device.

BACKGROUND

Recently, it is remarkable in increasing the definition of pictures due to an increase in the resolution of a digital camera and the like and increasing the capacity of a data storage device such as an SD™ card and achieving high picture quality by increasing the frame rate of picture data. Based on the above background, a transmission amount of data between the host device such as a digital camera or the like and a memory device or the like that records data continues to increase. In transmitting such a large amount of data, a high-speed serial transmission system based on a small amplitude differential signal is generally used from the viewpoint of simplifying connection cables, suppressing the power consumption and reducing EMI radiation noise. Further, in the above high-speed serial transmission system, it is general to use coding of 8b/10b in order to stabilize the transmission.

If the same data items (such as "00" or "FF") are successively transmitted at the data communication time by use of the serial transmission system, harmonic noise with a frequency component corresponding to a period of the successive patterns. Therefore, as a method for coping with the above case, a so-called scramble system that superimposes a random number on the data and transmits the result is known. For example, the system is disclosed in "High-Speed Serdes Devices and Applications", by David Robert Stauffer et. al., published by Springer, 2008, pp. 140 to 143.

However, in the conventional scramble system, a method for coping with a case wherein fixed patterns are successively transmitted in order to maintain synchronization of serial transmission at the data non-transmission time, that is, in an idle state is not taken into consideration and a problem that noise occurs in the idle state is not yet solved.

BRIEF DESCRIPTION OF THE DRAWINGS

FIG. 3 is a block diagram of a memory controller according to the first embodiment;

FIG. 4 is a diagram showing symbols according to the first embodiment;

FIG. 5 is a timing chart for illustrating the state of communication according to the first embodiment;

FIGS. 8 to 10 are graphs each showing a frequency spectrum according to the first embodiment;

FIG. 12 is a timing chart for illustrating the state of communication according to the second embodiment;

FIG. 13 is a flowchart for illustrating the operation of a memory system according to the second embodiment;

FIG. 14 is a graph showing a frequency spectrum according to the second embodiment;

FIG. 15 is a timing chart for illustrating the state of communication according to a modification of the second embodiment.

DETAILED DESCRIPTION

In general, according to one embodiment, a semiconductor device capable of communicating with a host apparatus includes: a symbol generation unit; a coding unit; and a transmission unit. The symbol generation unit includes a random number generation circuit and generates a symbol according to a random number generated by the random number generation circuit. The coding unit performs 8b/10b coding for the symbol. The transmission unit transmits the symbol coded by the 8b/10b coding unit to the host apparatus.

First Embodiment

A semiconductor device and memory system according to a first embodiment will be explained by taking an SD memory card (hereinafter simply referred to as a memory card) as an example.

<Whole Configuration of Memory Card>

Figures 1, 2:
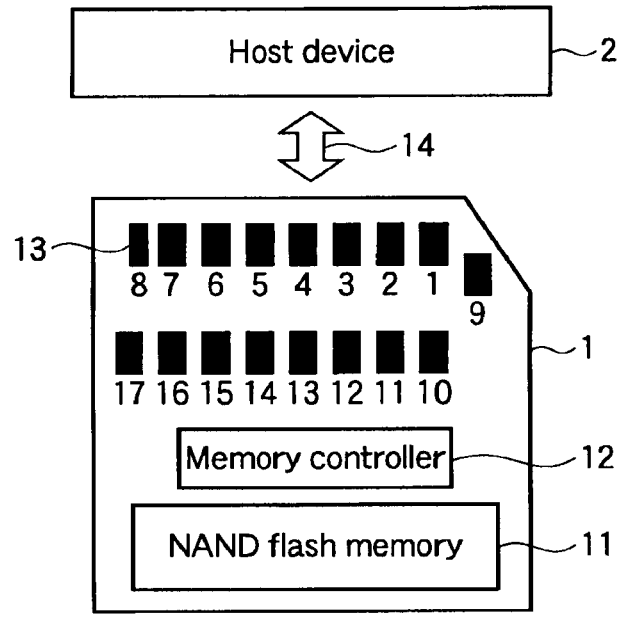
FIG. 1 is a block diagram of a memory system according to a first embodiment.
FIG. 2 is a diagram showing assignment of signals to signal pins in a memory card according to the first embodiment.

First, the whole configuration of a memory card is explained with reference to FIG. 1. FIG. 1 is a block diagram of a memory card according to the present embodiment.

As shown in the drawing, a memory card 1 is communicable with a host device 2 such as a personal computer, digital camera and the like, for example. The host device 2 includes software and hardware used for accessing the memory card 1 connected thereto via a bus interface 14. The memory card 1 is operated in response to reception of power supply when it is connected to the host device 2 and performs a process corresponding to access from the host device 2.

The memory card 1 transfers information with respect to the host device 2 via the bus interface 14. The memory card 1 includes a NAND flash memory chip (also simply referred to as a NAND flash memory or flash memory) 11, a memory controller 12 that controls the NAND flash memory chip 11 and a plurality of signal pins (first to seventeenth pins) 13.

The plural signal pins 13 are electrically connected to the memory controller 12. Assignment of signals to the first to seventeenth pins of the plural signal pins 13 is made as shown in FIG. 2, for example. FIG. 2 is a table showing the first to seventeenth pins and signals assigned to them.

Data 0 to data 3 are respectively assigned to the seventh, eighth, ninth and first pins. The first pin is also assigned to a card detection signal. Further, the second pin is assigned to command CMD, the third and sixth pins to ground potential GND, the fourth pin to power source potential VDD, and the fifth pin to clock signal CLK.

In addition, the tenth, thirteenth, fourteenth and seventeenth pins are assigned to supply voltage VDD or ground potential GND. Further, data (D1+) and data (D1−), and data (D0+) and data (D0−) that make pairs of differential signals are respectively assigned to the eleventh, twelfth, fifteenth and sixteenth pins. The above pins are terminals for complementary signals in small amplitude differential signals. For example, a signal pair of D0+ and D0− is used for signal transmission from the host device 2 to the memory card 1. Further, a signal pair of D1+ and D1− is used for signal transmission from the memory card 1 to the host device 2.

The memory card 1 is formed to be removably inserted with respect to a slot formed in the host device 2. A host controller (not shown) provided in the host device 2 communicates various signals and data items with the memory controller 12 in the memory card 1 via the first to seventeenth pins. For example, when data is written in the memory card 1, the host controller transmits a write command as a serial signal to the memory controller 12 via the eleventh and twelfth pins. At this time, the memory controller 12 fetches write commands supplied to the eleventh and twelfth pins in response to a clock signal supplied to the seventh and eighth pins.

The write commands are serially input to the memory controller 12 by using only the eleventh and twelfth pins. The eleventh and twelfth pins assigned to the command inputs are arranged as shown in FIG. 2 and a plurality of signal pins 13 and the bus interface 14 (SD interface) corresponding thereto are used to permit the memory card 1 and the host controller in the host device 2 to communicate with each other.

On the other hand, communication between the NAND flash memory 11 and the memory controller 12 is performed by an interface for the NAND flash memory. Therefore, the NAND flash memory 11 and the memory controller 12 are connected by input/output (I/O) lines of 8 bits, for example, although not shown in the drawing here.

For example, when the memory controller 12 writes data in the NAND flash memory 11, the memory controller 12 sequentially inputs a data input command 80H, column address, page address, data, and program command 10H to the flash memory 11 via the I/O lines. In this case, "H" of command 80H indicates a hexadecimal number and, in practice, signals of 8 bits of "10000000" are supplied in parallel to the I/O lines of 8 bits. That is, commands of a plurality of bits are supplied in parallel to the interface for the NAND flash memory.

Further, with the interface for the NAND flash memory, the command and data for the NAND flash memory 11 commonly utilize the same I/O lines and are communicated. Thus, the interface via which the host controller in the host device 2 and the memory card 1 communicate and the interface via which the NAND flash memory 11 and the memory controller 12 communicate are different.

<Configuration of Memory Controller 12>

Next, the detail of the memory controller 12 provided in the memory card 1 shown in FIG. 1 is explained. In this case, the NAND flash memory 11 has the known configuration, and therefore, the explanation thereof is omitted.

The memory controller 12 manages the internal physical state of the NAND flash memory 11 (for example, the number of logic sector address data contained in what one of physical block addresses or what one of blocks is set in the erase state). Then, the memory controller 12 performs the operation of reading data from the NAND flash memory 11 according to a request of the host device 12, transferring the same to the host device 2 and writing write data supplied from the host device 2 in the NAND flash memory 11. For simplifying the following explanation, the explanation is made with attention paid only to the configuration that performs communication from the memory controller 12 to the host device 2.

FIG. 3 is a block diagram of the memory controller 12. As shown in the drawing, the memory controller 12 includes a flash controller 21, buffer 22, command/data control unit 23, symbol generation unit 24, 8b/10b coding unit 25, host interface module 26, micro processing unit (MPU) 27, read-only memory (ROM) 28 and random access memory (RAM) 29. In this case, solid lines in the drawing indicate flows of data and symbols and broken lines indicate the control state by the MPU 27.

The flash controller 21 performs an interface process between the memory controller 12 and the NAND flash memory 11 based on control of the MPU 27. For example, at the data read time, it receives read data transferred from the NAND flash memory 11 and stores the same in the buffer 22.

The buffer 22 temporarily holds the read data and outputs the same to the command/data control unit 23.

The symbol generation unit 24 includes a random number generation circuit 32, issues various symbols (also called commands or control signals) required for communication with the host device 2 based on control of the MPU 27 and outputs the same to the command/data control unit 23. As the random number generation circuit 32, for example, a linear feedback shift register can be used. Of course, it is not limited to this. The symbol generation unit 24 can issue a symbol indicating an idle state at the data non-communication time. Then, the symbol generation unit 24 can generate a plurality of types of symbols as the symbol indicating the idle state and determines one of the plural types of symbols based on a random number generated by the random number generation circuit 32. This is explained later in detail.

The command/data control unit 23 selects one of read data from the buffer 22 and a symbol from the command/data control unit 23 and outputs the same to the 8b/10b coding unit 25 according to control of the MPU 27.

The 8b/10b coding unit 25 performs 8b/10b coding for a signal (read data or symbol) supplied from the command/data control unit 23 and outputs the result to the host interface module 26. The 8b/10b coding is a process for coding a signal of 8 bits to 10 bits. The coding is performed by use of a certain table and the coding result is expressed by symbol Dxx.x. That is, 8-bit data of "00H" to "FFH" is expressed by one of symbols of D00.0 to D31.7. The symbols are specifically called D-codes. Further, some of bit strings that are not used as the D-codes are used as control symbols and are called K-codes. The 8b/10b coding can be performed by use of a known technique and the detail thereof is described on pages 137 to 139 of the reference mentioned in BACKGROUND.

The host interface module 26 performs an interface process with respect to the host device 2. As shown in FIG. 3, the host interface module 26 includes a parallel-to-serial conversion unit 30 and serial output port 31. The parallel-to-serial conversion unit 30 converts 10-bit parallel data supplied from the 8b/10b coding unit 25 to serial data and outputs the same to the serial output port 31. The serial output port 31 transmits the received serial data to the host device 2 via the bus interface 14.

The MPU 27 controls the whole operation of the memory card 1. For example, the MPU 27 forms various tables on the RAM 29 by reading firmware (control program) stored in the ROM 28 on the RAM 29 and performing a preset process when the memory card 1 receives supply of power. Further, the MPU 27 receives a write command, read command and erase command from the host device 2 and controls the operations of the flash controller 21, command/data control unit 23, symbol generation unit 24, 8b/10b coding unit 25 and host interface module 26 according to the received command.

The ROM 28 stores a control program and the like executed by the MPU 27. The RAM 29 is used as a work area of the MPU 27 and stores control programs and various tables.

<Symbols Generated by Symbol Generation Unit 24>

Next, some of symbols generated by the symbol generation unit 24 are explained with reference to FIG. 4. FIG. 4 is a table showing symbol names of symbols generated by the symbol generation unit 24, the functions thereof and codes obtained by 8b/10b coding.

As shown in the drawing, the symbol generation unit 24 can generate symbols SYN, COM, LIDL0 and LIDL1. Symbol SYN is a signal used to attain synchronization with the host device and coded to symbol D31.5 by 8b/10b coding. Symbol COM is a signal indicating comma (i.e. delimiter or division between the symbols) and coded to symbol K28.5 by 8b/10b coding. Symbols LIDL0 and LIDL1 are signals indicating an idle state in which no data communication is performed between the memory card 1 and the host device 2. Symbol LIDL0 is a signal coded to symbol K28.3 by 8b/10b coding and symbol LIDL1 is a signal coded to symbol D13.2, D19.2 or D18.5.

<Communication Between Memory Card 1 and Host Device 2>

Next, the detail of communication between the memory card 1 and the host device 2 is explained with reference to FIG. 5. FIG. 5 is a timing chart of signals transmitted from the memory card 1 to the host device 2.

As shown in the drawing, the memory card 1 connected to the host device 2 transmits symbol set SYNC used to set up synchronization with the host device 2 to the host device 2. Symbol set SYNC is a combination of symbol COM and symbol SYN. One symbol set SYNC including symbols COM, SYN is continuously transmitted (times t0 to t1) until synchronization with the host device 2 is attained.

The operation of the memory controller 21 in a period of times t0 to t1 is as follows. That is, when detecting connection to the host device 2, the MPU instructs the symbol generation unit 24 to generate symbols COM, SYN. In response to this, the symbol generation unit 24 repeatedly generates symbols COM, SYN and outputs the same to the command/data control unit 23. Further, the command/data control unit 23 transfers symbols COM, SYN supplied from the symbol generation unit 24 to the 8b/10b coding unit 25 according to the instruction of the MPU 27. Then, the 8b/10b coding unit 25 respectively codes received symbols COM, SYN to symbols K28.5, D31.5 according to the instruction of the MPU 27 and outputs the same to the host interface module 26. Then, the host interface module 26 transmits received symbols K28.5, D31.5 to the host device 2.

If synchronization with the host device 2 is set up at time t1, data communication is performed. That is, as shown by times t1 to t2 of FIG. 5, a data signal is transmitted from the memory card 1 to the host device 2. The data signal is a series of D-codes obtained by 8b/10b coding.

The operation of the memory controller 12 in a period of times t1 to t2 is as follows. That is, when receiving a data read command and address from the host device 2, the MPU 27 issues a read command and address with respect to the NAND flash memory 11 and instructs the NAND flash memory 11 to read data via the flash controller 21. Then, read data corresponding to the transmitted address is received by the flash controller 21 and stored in the buffer 22. Subsequently, the command/data control unit 23 transfers read data from the buffer 22 to the 8b/10b coding unit 25 according to the instruction of the MPU 27. Then, the 8b/10b coding unit 25 codes the received data to a corresponding D-code according to the instruction of the MPU 27 and outputs the result to the host interface module 26. After this, the host interface module 26 transmits the received D-code to the host device 2.

When data communication is completed at time t2, the memory card 1 is set to an idle state and transmits symbol set IDL indicating the idle state to the host device 2. Symbol set IDL is a combination of symbol COM and symbol LIDL0 or LIDL1. For simplifying the following explanation, if symbols LIDL0 and LIDL1 are not distinguished from each other, the symbols are called LIDLx (x=0 or 1). One symbol set IDL containing symbols COM and LIDLx is continuously transmitted (times t2 to t3) until next data communication is started (time t3).

The operation of the memory controller 12 in a period from times t1 to t2 is as follows. That is, when detecting that non-transmitted data to the host device 2 is no more present in the buffer 2, the MPU 27 instructs the symbol generation unit 24 to generate symbols COM and LIDLx. In response to this, the symbol generation unit 24 repeatedly generates symbols COM and LIDLx and outputs the same to the command/data control unit 23. Further, the command/data control unit 23 transfers symbols COM and LIDLx supplied from the symbol generation unit 24 to the 8b/10b coding unit 25 according to the instruction of the MPU 27. Then, the 8b/10b coding unit 25 codes received symbol COM to symbol K28.5 according to the instruction of the MPU 27. Further, when receiving symbol LIDL0, it codes the same to symbol K28.3 and when receiving symbol LIDL1, it codes the same to symbol D13.2, D19.2 or D18.5. Then, the host interface module 26 transmits the received symbol to the host device 2. Symbol set IDL is repeatedly transmitted to the host device 2 until data communication is later started again with respect to the host device 2.

<Operation of Symbol Generation Unit 24>

Figure 6:
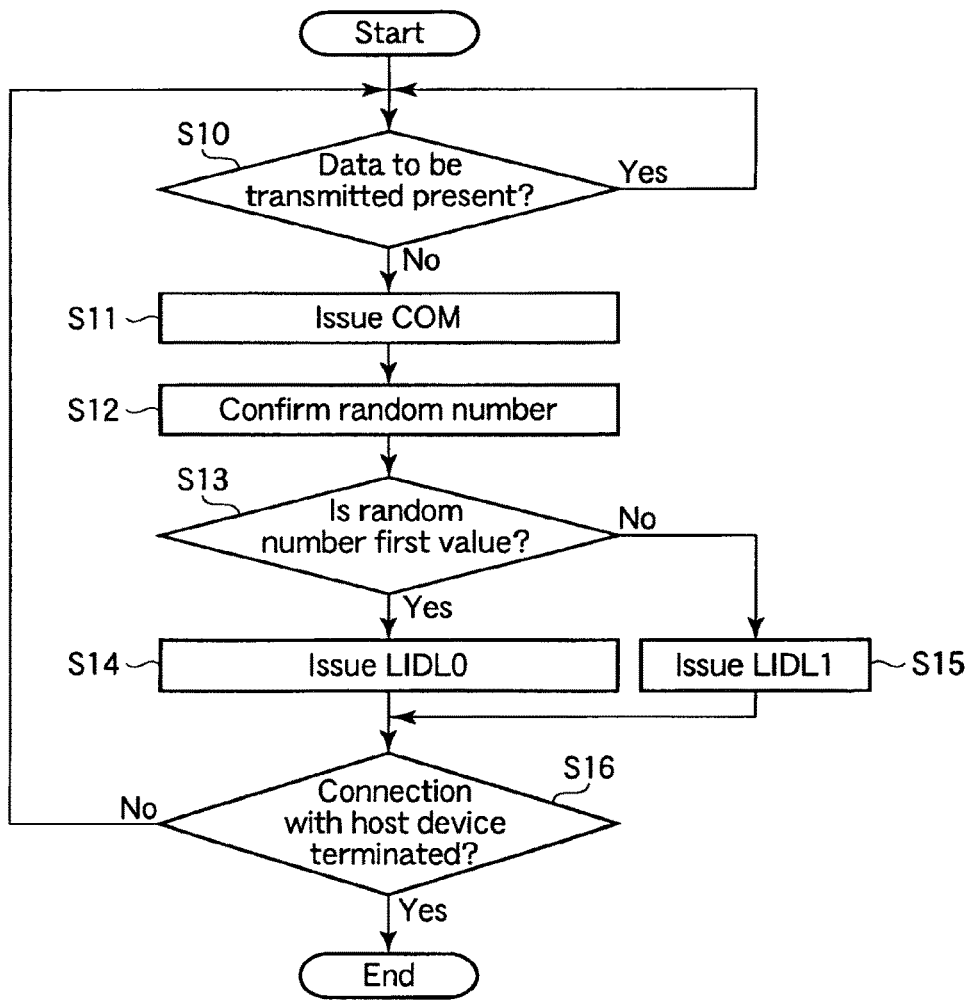
FIG. 6 is a flowchart for illustrating the operation of a symbol generation unit according to the first embodiment.

Next, the operation of the symbol generation unit 24 in times t2 to t3 explained in FIG. 5 is explained with reference to FIG. 6. FIG. 6 is a flowchart for illustrating the operation of the symbol generation unit 24.

As shown in the drawing, when data to be transmitted to the host device 2 is not present (NO in step S10), the symbol generation unit 24 first issues symbol COM (step S11). Subsequently, the symbol generation unit 24 confirms a random number generated from the random number generation circuit 32. Then, if the random number is a predetermined value ("first value") (YES in step S13), it issues symbol LIDL0 (step S14). On the other hand, if it is not the first value (NO in step S13), it issues symbol LIDL1 (step S15). For example, in case the random number is 1-bit signal, the probability of issuing symbol LIDL0 is the same as the probability of issuing symbol LIDL1. In that, the probability of issuing symbol LIDL0 is 50%, and the probability of issuing symbol LIDL1 also is 50%.

The above operation is repeatedly performed until connection with the host device 2 is broken (YES in step S16) or data transmission timing is reached (YES in step S10). The random number generation circuit 32 may always generate a random number and generate the same only in a period while the MPU 27 gives an instruction to issue symbol set IDL.

Effect of Present Embodiment

As described above, with the memory card 1 according to the first embodiment, noise occurring at the communication time can be reduced. The effect is explained below.

In the high-speed serial transmission system described in the BACKGROUND, a symbol set (symbol COM+SYN explained in FIG. 5) used to set up synchronization is continuously transmitted at the data transmission start time. After synchronization is set up, data transmission is started.

In the above system, it can be considered to continuously transmit a specified symbol used as an idle symbol indicating the idle state in a period from the time when a series of data transmissions is terminated to the time when next data transmission is started. The idle symbol is a symbol to maintain synchronization with the host device.

Figure 7:
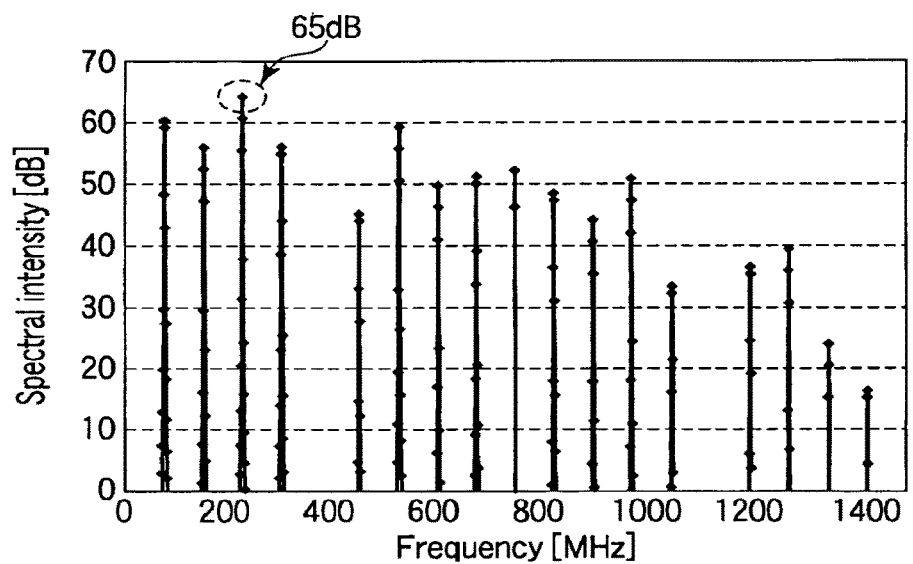
FIG. 7 is a graph showing a frequency spectrum at the communication time.

As the idle symbol, symbol K28.3 (hereinafter referred to as symbol LIDL) can be used. However, K28.3 is a code of "001111_0010" or "110000_1101" in the binary notation and is a signal having "0" or "1" successively generated. Therefore, when symbol set COM+LIDL is successively transmitted, a signal having 0 or 1 successively in a specified pattern is repeatedly transmitted. Then, there occurs a problem that the peak of a certain spectrum becomes large and this causes occurrence of noise, particularly, EMI noise by repeating a specified pattern of symbol set COM+LIDL. The state is shown in FIG. 7. FIG. 7 is a graph showing a frequency spectrum obtained as the result of simulation of a case wherein LIDL is used as the idle symbol, the abscissa represents the frequency in MHz and the ordinate represents the intensity in dB. As shown in the drawing, the frequency spectrum discretely occurs and the intensity thereof is relatively high and reaches 65 dB, particularly, around 200 MHz.

In this respect, with the configuration according to this embodiment, two symbols LIDL0, LIDL1 are used as the idle symbol. LIDL among them is symbol K28.3 that is the same as LIDL, but LIDL1 is a symbol different from LIDL0. Whether LIDL0 or LIDL1 is used as the idle symbol is randomly selected according to a random number generated by the random number generation circuit 32. As a result, the same "0"/"1" pattern is suppressed from being successively generated in the successive symbol set and radiation of harmonics contained in the pattern can be suppressed. Thus, occurrence of noise can be effectively suppressed while maintaining synchronization with the host device 2.

Figure 8:
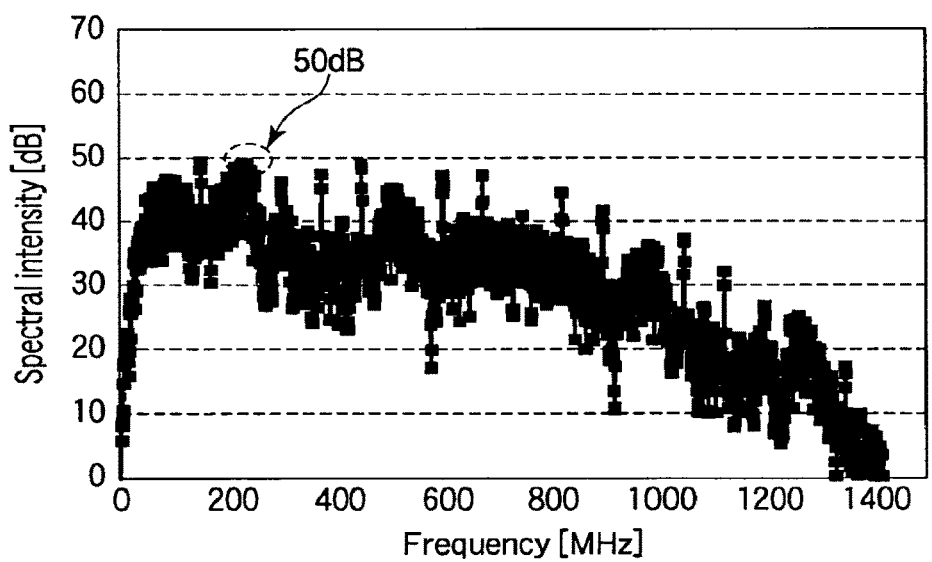

FIG. 8 is a graph showing a frequency spectrum obtained as the result of simulation of a case wherein D13.2 is used as LIDL1. As shown in the drawing, the peaks of the frequency spectrum are more successive (it is not discrete) in comparison with the example of FIG. 7 and, as a result, the intensity of each peak becomes low. For example, the peak intensity around 200 MHz is 50 dB and is lower than that of FIG. 7 by 15 dB. A lowering of 15 dB corresponds to 1/30 in terms of electric power. Thus, noise can be reduced by lowering the peak intensity.

Further, FIGS. 9 and 10 are graphs showing frequency spectra obtained as the result of simulation of cases wherein D19.2 and D18.5 are used as LIDL1. As shown in the drawing, also in this case, the peak intensity of the frequency spectrum is lower than the example of FIG. 7.

In the above embodiment, an example in which symbol D13.2, D19.2 or D18.5 is used as LIDL1 is explained. However, symbols other than the above symbols may be used. That is, since it is satisfactory to provide the configuration in which repetition of the same data pattern is difficult to occur, the configuration is not limited if plural types of symbols are used as LIDL.

In 8b/10b coding, a symbol in which the number of bits which are set to "1" is seven bits or more or three bits or less among ten bits is not used in order to maintain DC balance of a symbol (code). If a symbol in which the number of bits which are set to "1" and the number of bits which are set to "0" are each set to five bits among ten bits is used, the DC balance can be attained. However, if the restriction that the change point between "0" and "1" (the bit position in which the bit is changed from "0" to "1" or from "1" to "0") properly occurs in a symbol is taken into consideration on the assumption that a coded symbol is serially transmitted in an NRZ system, only 134 codes of approximately half of 256 codes from 0x00 to 0xFF are defined for a symbol in which "1" and "0" of five bits are set in a balanced state. The remaining 122 codes are defined as symbols in which the number of bits that are set to "1" is six bits or four bits.

In this case, in order to easily set the equilibrium of DC balance, an index of running disparity (that is hereinafter referred to as RD) is used. That is, every two sets of a symbol including six bits that are set to "1" and a symbol including four bits are defined for each code. The former is defined as a symbol of RD+ and the latter is defined as a symbol of RD−. The symbol in which the numbers of "1" and "0" are set to just five bits as explained before is defined as RD±0.

In 8b/10b coding, symbols are selected so that RD+ and RD− alternately appear in successive symbols. In the case of the symbol with RD±0, RD of a next symbol is selected as a successor of immediately prior RD.

Thus, a symbol string that is 8b/10b-coded and transmitted utilizes a system in which codes of RD+ and RD− are alternately generated in order to maintain the DC balance. However, if successive COM, LIDL symbols are transmitted like an IDL symbol set transmitted in the idle state, inversion of RD periodically occurs in a case where a method of creating a random form according to the present embodiment is not used. For example, if IDL symbol sets each of which is configured by COM (K28.5) and LIDL0 (K28.3) are successively transmitted, RD is inverted for each symbol and a fixed pattern of 2-symbol period is transmitted. If such a periodic fixed pattern is transmitted, strong EMI noise occurs in the period and harmonic noise depending on the pattern occurs in frequencies that are integral multiple of the period.

In the present embodiment, inversion of RD occurs once in the IDL symbol set of COM, LIDL1 by using symbol D13.2, D19.2 or D18.5 that is set to RD±0 as LIDL1. In a K symbol configuring COM and LIDL0, an RD+ symbol is obtained by inverting the value of each bit of the RD− symbol. Therefore, in the symbol set in which RD is inverted, spectral components are set in a phase-inverted relationship. Therefore, if the IDL symbol sets of COM and LIDL0 that sandwich the IDL symbol set configured by COM and LIDL1 are transmitted, spectral components of the IDL symbol sets of COM and LIDL0 cancel each other and the effect of suppressing harmonic noise depending on the pattern can be expected.

However, if a system of inverting RD by alternately transmitting the IDL symbol set of COM and LIDL0 and the IDL symbol set of COM and LIDL1 or transmitting the IDL symbol set of COM and LIDL1 after the IDL symbol set of COM and LIDL0 is transmitted by N times is used, occurrence of EMI noise in the inversion period cannot be suppressed due to the fixed RD inversion period. Therefore, in the present embodiment, in order to prevent the period of RD inversion from being fixed, it is proposed to dispersedly set the period of RD inversion and suppress the peak of EMI noise by selecting the symbol set of LIDL0 and the symbol set of LIDL1 according to a random number.

It is confirmed that LIDL symbols D13.2, D19.2 and D18.5 explained in the above embodiment are each set to a symbol that becomes RD±0 and the EMI noise suppression effect can be attained by a combination with LIDL0 (K28.3). Further, the above symbols are symbols in which it is confirmed that the suppression effect is large by simulation among a plurality of LIDL1 symbol candidates that become RD±0.

Second Embodiment

Next, a semiconductor device and memory system according to a second embodiment will be explained. In the present embodiment, random number data is included in a symbol set instead of using plural types of symbols as an idle symbol. In the following description, only a portion different from the first embodiment is explained.

<Configuration of Memory Controller 12>

Figure 11:
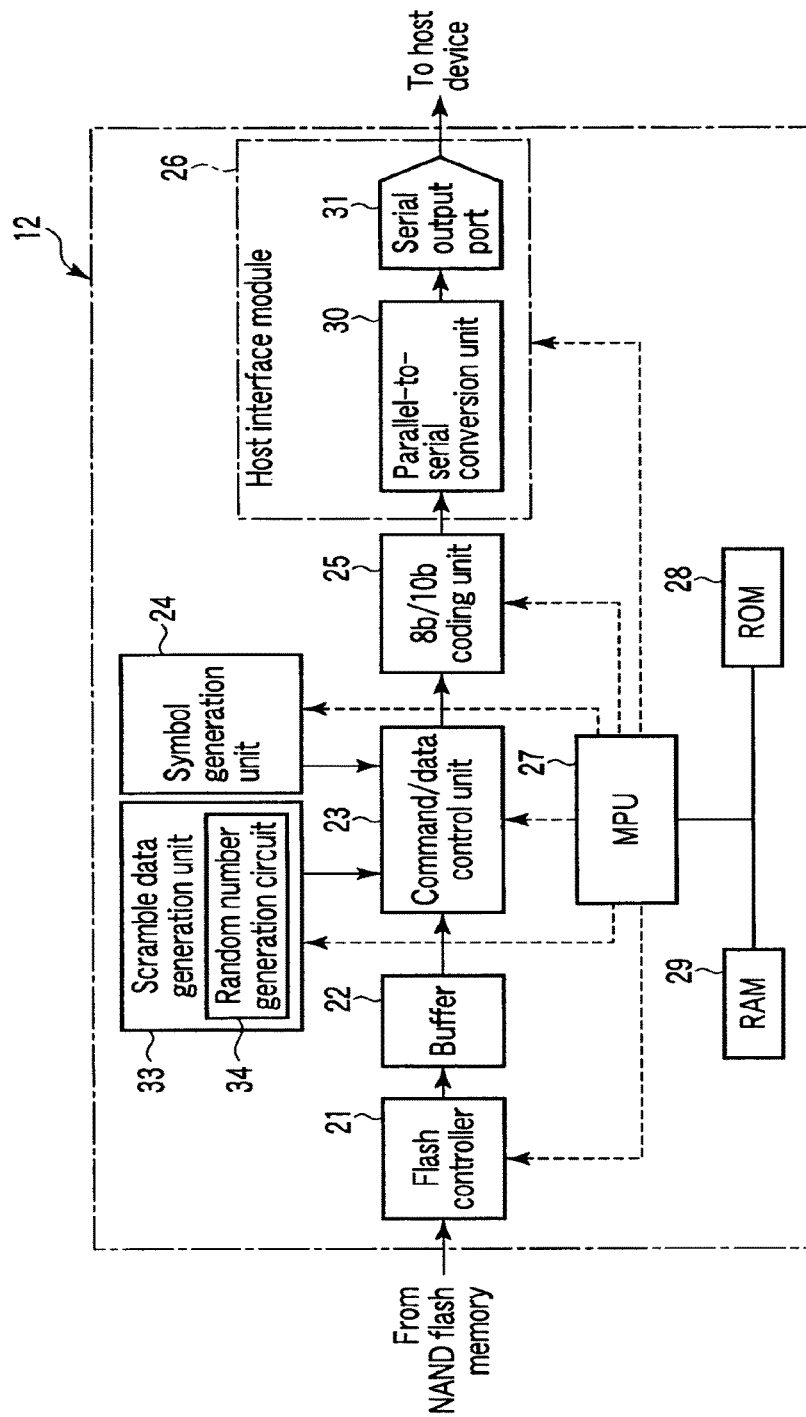
FIG. 11 is a block diagram of a memory controller according to a second embodiment.

FIG. 11 is a block diagram of a memory controller 12 according to the present embodiment. As shown in the drawing, the memory controller 12 according to the present embodiment is formed with the configuration in which a scramble data generation unit 33 is further provided in the configuration of FIG. 3 explained in the first embodiment.

The scramble data generation unit 33 includes a random number generation circuit 34. Then, it generates, for example, 8-bit random number data (scramble data) SRDi (i=0 to N, where N is a natural number greater than or equal to 1) by use of the random number generation circuit 34 according to control of an MPU 27. As the random number generation circuit 34, a linear feedback register may be used, for example.

An 8b/10b coding unit 25 has a function of performing 8b/10b coding for scramble data SRDi generated by the scramble data generation unit 33 in addition to the function explained in the first embodiment.

A symbol generation unit 24 issues one type of symbol LIDL as an idle symbol. Symbol LIDL is K28.3, for example. That is, the configuration in which only LIDL0 can be issued as the idle symbol in the first embodiment is provided.

<Communication Between Memory Card 1 and Host Device 2>

Next, the detail of communication between a memory card 1 and a host device 2 is explained with reference to FIG. 12. FIG. 12 is a timing chart of signals transmitted from the memory card 1 to the host device 2 and corresponds to FIG. 5 in the first embodiment. However, since the operation of setting up synchronization with the host device 2 is the same as that of the first embodiment, the state is not shown in the drawing. Further, in the following description, only the operation in times t2 to t3 different from that of the first embodiment is explained.

When data communication is completed at time t2, the memory card 1 is set into an idle state and transmits symbol set IDL to the host device 2. Symbol set IDL is a combination of symbol COM, symbol LIDL and a symbol corresponding to scramble data SRDi generated by the scramble data generation unit 33. Since scramble data SRDi is a random number generated by the random number generation circuit 34, the value of scramble data SRDi varies each time symbol set IDL is generated. One symbol set IDL containing symbols COM, LIDL and SRDi is successively transmitted (times t2 to t3) until next data communication is started (time t3).

The operation of the memory controller 12 in a period of times t2 to t3 is as follows. That is, when detecting that non-transmitted data to the host device 2 is no more present in the buffer 2, the MPU 27 instructs the symbol generation unit 24 to generate symbols COM and LIDL. In response to this, the symbol generation unit 24 repeatedly generates symbols COM and LIDL and outputs the same to a command/data control unit 23. Further, the MPU 27 instructs the scramble data generation unit 33 to generate scramble data SRDi. In response to this, the scramble data generation unit 33 generates scramble data SRDi using the random number generation circuit 34 and outputs the same to the command/data control unit 23. Then, the command/data control unit 23 transfers symbols COM and LIDL supplied from the symbol generation unit 24 and scramble data SRDi supplied from the scramble data generation unit 33 to the 8b/10b coding unit 25 according to the instruction of the MPU 27. Then, the 8b/10b coding unit 25 performs 8b/10b coding for received symbols COM, LIDL and scramble data SRDi according to the instruction of the MPU 27. Then, a host interface module 26 transmits the received symbols to the host device 2. Symbol set IDL is repeatedly transmitted to the host device 2 until data communication is later started again with respect to the host device 2.

<Operations of Symbol Generation Unit 24 and Scramble Data Generation Unit 33>

Next, the operations of the symbol generation unit 24 and scramble data generation unit 33 in times t2 to t3 explained in FIG. 12 is explained with reference to FIG. 13. FIG. 13 is a flowchart for illustrating the operations of the symbol generation unit 24 and scramble data generation unit 33.

As shown in the drawing, when data to be transmitted to the host device 2 is not present (NO in step S10), the symbol generation unit 24 first issues symbol COM (step S11) and subsequently issues symbol LIDL (step S20). Further, the scramble data generation unit 33 generates scramble data SRDi (step S21).

The above operation is repeatedly performed until connection with the host device 2 is broken (YES in step S16) or data transmission timing is reached (YES in step S10). The random number generation circuit 34 may always generate a random number and generate the same only in a period while the MPU 27 gives an instruction to generate scramble data SRDi.

Effect of Present Embodiment

As described above, with the memory card 1 according to the second embodiment, the same effect as that of the first embodiment can be attained.

With the configuration according to the present embodiment, scramble data SRDi is contained in a symbol set instead of setting the number of types of idle symbols to one type (LIDL: K28.3). Scramble data SRDi is generated by the random number generation circuit 34. More specifically, the scramble data is a byte string generated by an M sequence and is a random number formed by a generator polynomial (X15+X5+X4+X3+X1), for example.

A signal in which "0"/"1" successively occurs in a certain pattern can be suppressed from being repeated and an increase in the peak of the frequency spectrum can be prevented by introducing the above random number in a symbol set. FIG. 14 is a graph of a frequency spectrum showing the result of simulation of the present embodiment. As shown in the drawing, the spectrum becomes more continuously and the peak intensity is more reduced in comparison with a case of FIG. 7 explained in the first embodiment. For example, the peak intensity around 200 MHz is approximately 60 dB and is reduced by 5 dB in comparison with a case of FIG. 7. As a result, noise can be reduced.

In this embodiment, a case wherein one symbol set indicating the idle state is COM+LIDL+SRDi is explained as an example, but the number of scramble data items SRDi may be set to 2 bytes or more. FIG. 15 is a timing chart of signals transmitted from the memory card 1 to the host device 2, for illustrating a case wherein 2-byte scramble data items SRDi, SRD(i+1) are contained in one symbol set. As shown in the drawing, the first symbol set is COM+LIDL+SRD0+SRD1, a symbol set following this is COM+LIDL+SRD2+SRD3 and they are similarly determined.

Thus, the spectrum can be more widely spread and noise can be reduced by increasing the number of bytes of scramble data. In this case, it is preferable to set the number of scramble data items to 2n (where n is a natural number), that is, data amount of the scramble data is 2n bytes.

Third Embodiment

Next, a semiconductor device and memory system according to a third embodiment will be explained. The present embodiment is attained by applying the first embodiment to symbol SYN (hereinafter referred to as a synchronization symbol). That is, in the present embodiment, two types of SYN (SYN0, SYN1) are generated instead of generating two types of LIDL in the first embodiment. The other is the same as that of the first embodiment, and therefore, it is simply explained below.

<Communication Between Memory Card 1 and Host Device 2>

Figure 16:
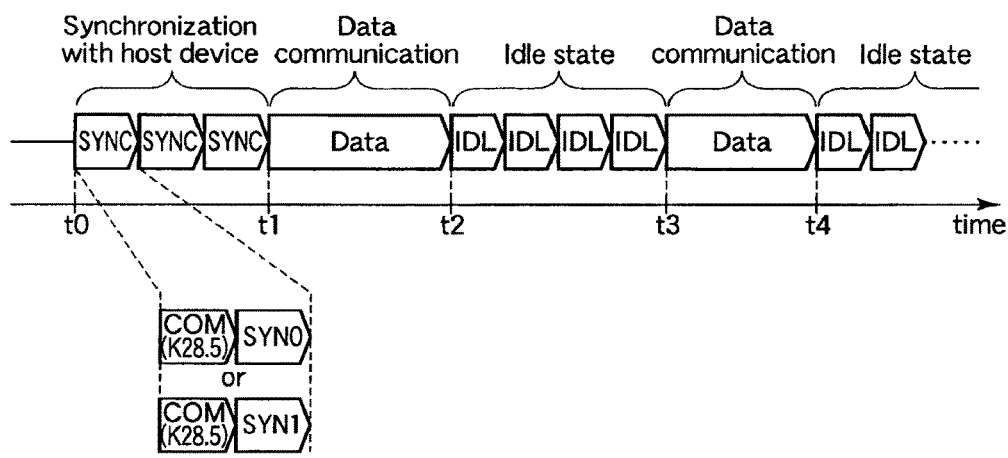
FIGS. 16 and 17 are timing charts each for illustrating the state of communication according to a third embodiment.

FIG. 16 is a timing chart of signals transmitted from a memory card 1 to a host device 2. As shown in the drawing, as symbol set SYNC used to set up synchronization with the host device 2, COM+SYN0 or COM+SYN1 is selected. Whether SYN0 or SYN1 is generated is determined based on a random number generated by a random number generation circuit 32 in a symbol generation unit 24 like LIDL0, LIDL1 explained in the first embodiment.

Effect of Present Embodiment

With the configuration according to the present embodiment, the same effect as that of the first embodiment can be attained. When setting up synchronization with the host device 2, symbol set SYNC is repeatedly transmitted. Therefore, also, in this period, there occurs a possibility that a signal in which "0"/"1" successively occurs in a certain pattern may be repeated. However, a signal in which "0"/"1" successively occurs in a certain pattern can be prevented from being repeated and noise can be reduced by preparing two types of symbols SYN (SYNx: x=0 or 1) as in this embodiment and randomly selecting one of them. Further, it is desirable to set SYNx to a symbol in which RD becomes ±0 as in the first embodiment.

Fourth Embodiment

Next, a semiconductor device and memory system according to a fourth embodiment will be explained. The present embodiment is attained by applying the second embodiment to symbol SYN (hereinafter referred to as a synchronization symbol). That is, in the present embodiment, scramble data SRDi is not instead in symbol set IDL as in the second embodiment but included in symbol set SYNC. The other is the same as that of the second embodiment and it is simply explained below.

<Communication Between Memory Card 1 and Host Device 2>

Figure 17:
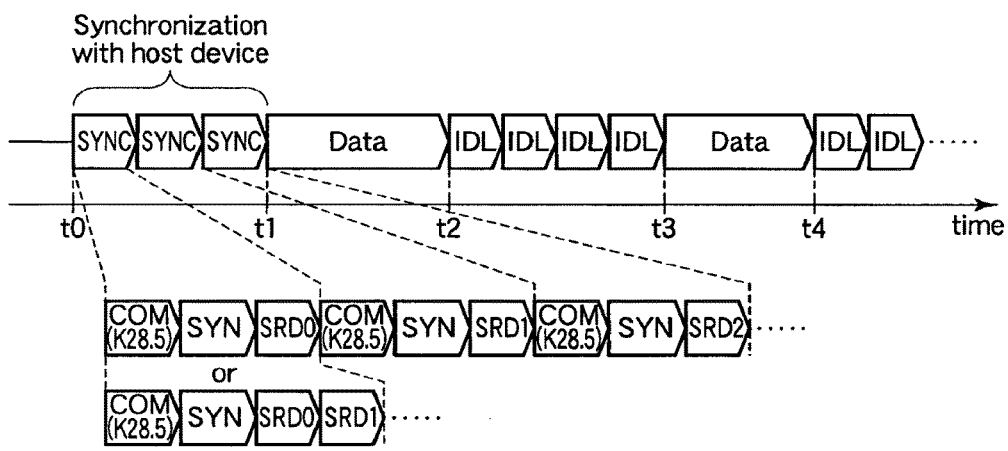

FIG. 17 is a timing chart of signals transmitted from a memory card 1 to a host device 2. As shown in the drawing, symbol set SYNC used to set up synchronization with the host device 2 is COM+SYN+SRDi. Of course, scramble data contained in one symbol set SYNC may be set to two bytes or more.

Effect of Present Embodiment

With the configuration according to the present embodiment, the same effect as that of the second embodiment can be attained.

As described above, the semiconductor device 12 and memory system 1 according to the first and third embodiments can communicate with the host apparatus 2. The device 12 and system 1 includes a symbol generation unit 24 which includes a random number generation circuit 32 and generates a symbol LIDL0, LIDL1 (or SYN0, SYN1) according to a random number generated by the random number generation circuit 32; a coding unit 25 which performs 8b/10b coding for the symbol; and a transmission unit 26 which transmits the symbol coded by the 8b/10b coding unit 25 to the host apparatus 2.

Further, the semiconductor device 12 and memory system 1 according to the second and fourth embodiments can communicate with the host apparatus 2. The device 1 and system 1 includes a symbol generation unit 24 capable of generating a symbol; a scramble data generation unit 33 capable of generating scramble data SRD; a coding unit 25 which performs 8b/10b coding for the symbol and scramble data SRD; and a transmission unit 26 which transmits, to the host apparatus 2, the symbol and scramble data SRD coded by the 8b/10b coding unit 25 as one symbol set.

For example, the symbol indicates an idle state which is non-communication period with the host device 2 or is used to set up synchronization with the host device 2.

Further, in the first and third embodiments, a case wherein an idle symbol is two types of LIDL0 and LIDL1 and a synchronization symbol is two types of SYN0 and SYN1 is explained as an example. However, the symbol generation unit 24 may be configured to generate three or more types of idle symbols and synchronization symbols. Even in the case of three or more types, one of the symbols to be generated is determined according to a random number. Further, the symbol generation unit 24 may generate a plurality of symbols, then select one of them according to a random number and output the selected symbol to the command/data control unit 23 without determining a to-be-generated symbol according to a random number.

Further, the first and second embodiments may be combined. That is, symbol set IDL at an idle time may be configured by use of symbol COM+(LIDL0 or LIDL1)+SRDi. This also applies to the third and fourth embodiments. That is, symbol set SYNC at a synchronization time may be configured by use of symbol COM+(SYN0 or SYN1)+SRDi.

Further, in the first and second embodiments, a case wherein a plurality of symbols are prepared only for the idle symbol or scramble data is added thereto is explained. Further, in the third and fourth embodiments, a case wherein a plurality of symbols are prepared only for the synchronization symbol or scramble data is added thereto is explained. However, the first or second embodiment and the third or fourth embodiment can be simultaneously performed. That is, a plurality of symbols may be prepared for both of the idle symbol and synchronization symbol or scramble data may be added thereto.

Further, the first to fourth embodiments can be applied to a symbol other than the idle symbol and synchronization symbol. That is, if another symbol in which it is assumed to cause occurrence of noise due to repetition of a signal in which "0"/"1" successively occurs in a certain pattern is used, the same effect can be attained by preparing plural types of symbols and randomly selecting one of them or adding random data thereto.

Further, as explained in the BACKGROUND, data may be transmitted to the host device 2 while it is kept set in the scrambled state. In this case, in FIGS. 3 and 11, the scramble data generation unit 33 may be provided between the buffer and the command/data control unit 23 and read data supplied from the buffer 22 may be scrambled by the scramble data generation unit 33. Further, the recent transmission speed of high-speed serial data transmission by use of a small amplitude differential signal is increased to 1 Gbps or more. Then, in the high-speed data transmission of 1 Gbps or more, a system for multiplexing a data signal and clock signal on the same signal line and transmitting them is used. This is known as a clock multiplex system. In the clock multiplex system, a clock is played back by detecting a signal toggle of a transmission signal on the data reception side and is used as a clock signal for reception. If the first to fourth embodiments are applied to the above extremely high-speed data transmission system, a more significant effect can be attained.

Further, generation of the symbols and random data explained in the first to fourth embodiments may be performed by use of hardware or performed by use of software. However, from the viewpoint of operation speed, it is desirable to use exclusive hardware. When it is performed by use of software, for example, the operation shown in FIG. 6 is performed by storing a symbol generation program in a ROM 28 or the like and permitting an MPU 27 to execute the program. This also applies to generation of random data.

Further, in the first to fourth embodiments, only the configuration of the memory card 1 that outputs a signal to the host device 2 is explained. When a signal is received from the host device 2, the reverse operation of that at the transmission time may be performed. For example, the host interface module 26 includes a serial input port and serial-to-parallel conversion unit. Then, the serial input port receives a signal from the host device 2 and the serial-to-parallel conversion unit converts the same to a parallel signal. Subsequently, the 8b/10b coding unit 25 codes 10-bit parallel data to 8 bits and stores the same in the buffer 22.

Then, the MPU 27 issues a data write command with respect to the NAND flash memory 11 and outputs data to the NAND flash memory 11 via the flash controller 21.

Further, in FIGS. 5, 12, 16 and 17, when synchronization with the host device 2 is set up, the memory card 1 also receives symbol set SYNC from the host device 2. Further, it receives symbol set IDL from the host device 2 at an idle time. As explained in the first to fourth embodiments, the symbols may be symbols selected from a plurality of symbols based on a random number or symbols to which scramble data is added. That is, not only the memory card 1 but also the host device 2 may have the configuration according to the first to fourth embodiments and the above embodiments are intended to contain the above configuration.

Of course, in the above embodiment, a case wherein the SD memory card is used as the memory system is explained as an example, but another device having an SD interface such as an SD IO device or ultra-high-speed (UHS) II card may be used and the other device may be used. Of course, it is not limited to a memory card having the NAND flash memory 11, another storage medium may be used and an electronic device that performs high-speed data transfer can be widely applied without being limited to the storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A semiconductor device, comprising:
a semiconductor memory capable of holding data; and
a controller circuit capable of accessing the semiconductor memory based on a command from a host apparatus,
wherein the controller circuit is capable of performing 8b/10b coding for a first symbol and a second symbol, and transmits the 8b/10b coded symbol of either one symbol randomly selected between the first symbol and the second symbol, and transmits the 8b/10b coded symbol to the host apparatus,
wherein the first and second symbols indicate an idle state,
wherein the controller circuit performs a transmit operation to transmit a symbol set repeatedly to the host apparatus,
wherein the symbol set includes a 8b/10b coded symbol of a third symbol and the 8b/10b coded symbol of either one symbol randomly selected between the first symbol and the second symbol,
wherein the selection between the first symbol and the second symbol is performed for each of the symbol sets when transferring the symbol set repeatedly,
wherein the first symbol is a symbol in which a running disparity becomes ±0,
wherein each of the second and third symbols includes a symbol as a plus running disparity and another symbol as a minus running disparity,
wherein the controller circuit performs in the transmit operation:

transmitting the 8b/10b coded symbol of the third symbol having a first disparity of the plus running disparity and the minus running disparity;
immediately after transmitting the 8b/10b coded symbol of the third symbol as the first disparity, transmitting the 8b/10b coded symbol of the first symbol;
immediately after transmitting the 8b/10b coded symbol of the first symbol, transmitting the 8b/10b coded symbol of the third symbol having a second disparity of the plus running disparity and the minus running disparity;
transmitting the 8b/10b coded symbol of the third symbol having a third disparity of the plus running disparity and the minus running disparity;
immediately after transmitting the 8b/10b coded symbol of the third symbol as the third disparity, transmitting the 8b/10b coded symbol of the second symbol;
immediately after transmitting the 8b/10b coded symbol of the second symbol, transmitting the 8b/10b coded symbol of the third symbol having a fourth disparity of the plus running disparity and the minus running disparity;
wherein the first disparity is different from the second disparity between the plus running disparity and the minus running disparity; and
wherein the third disparity is the same as the fourth disparity between the plus running disparity and the minus running disparity.

2. The device according to claim 1, wherein data to be transmitted from the device to the host apparatus is scrambled, and the scrambled data is transmitted to the host apparatus.

3. The device according to claim 1, wherein the controller circuit selects one of the first and second symbols according to a random number.

4. The device according to claim 1, wherein the controller circuit transmits, to the host apparatus, the coded symbol and coded scramble data as one symbol set.

5. A semiconductor device, comprising:
a semiconductor memory capable of holding data; and
a controller circuit capable of accessing the semiconductor memory based on a command from a host apparatus,
wherein the controller circuit is capable of performing 8b/10b coding for a first symbol and a second symbol, and transmits the 8b/10b coded symbol of either one symbol randomly selected between the first symbol and the second symbol, and transmits the 8b/10b coded symbol to the host apparatus,
wherein the first and second symbols are used for synchronization with the host apparatus,
wherein the controller circuit performs a transmit operation to transmit a symbol set repeatedly to the host apparatus,
wherein the symbol set includes a 8b/10b coded symbol of a third symbol and the 8b/10b coded symbol of either one symbol randomly selected between the first symbol and the second symbol,
wherein the selection between the first symbol and the second symbol is performed for each of the symbol sets when transferring the symbol set repeatedly,
wherein the first symbol is a symbol in which a running disparity becomes ±0,
wherein each of the second and third symbols includes a symbol as a plus running disparity and another symbol as a minus running disparity,
wherein the controller circuit performs in the transmit operation:
transmitting the 8b/10b coded symbol of the third symbol having a first disparity of the plus running disparity and the minus running disparity;
immediately after transmitting the 8b/10b coded symbol of the third symbol as the first disparity, transmitting the 8b/10b coded symbol of the first symbol;
immediately after transmitting the 8b/10b coded symbol of the first symbol, transmitting the 8b/10b coded symbol of the third symbol having a second disparity of the plus running disparity and the minus running disparity;
transmitting the 8b/10b coded symbol of the third symbol having a third disparity of the plus running disparity and the minus running disparity;
immediately after transmitting the 8b/10b coded symbol of the third symbol as the third disparity, transmitting the 8b/10b coded symbol of the second symbol;
immediately after transmitting the 8b/10b coded symbol of the second symbol, transmitting the 8b/10b coded symbol of the third symbol having a fourth disparity of the plus running disparity and the minus running disparity;
wherein the first disparity is different from the second disparity between the plus running disparity and the minus running disparity; and
wherein the third disparity is the same as the fourth disparity between the plus running disparity and the minus running disparity.

6. The device according to claim 5, wherein data to be transmitted from the device to the host apparatus is scrambled, and the scrambled data is transmitted to the host apparatus.

7. The device according to claim 5, wherein the controller circuit selects one of the first and second symbols according to a random number.

8. The device according to claim 5, wherein the controller circuit transmits, to the host apparatus, the coded symbol and coded scramble data as one symbol set.

* * * * *